Feb. 22, 1938.    J. G. HICKMAN    2,109,249
VENTILATING WINDOW
Filed Aug. 12, 1935    2 Sheets-Sheet 2
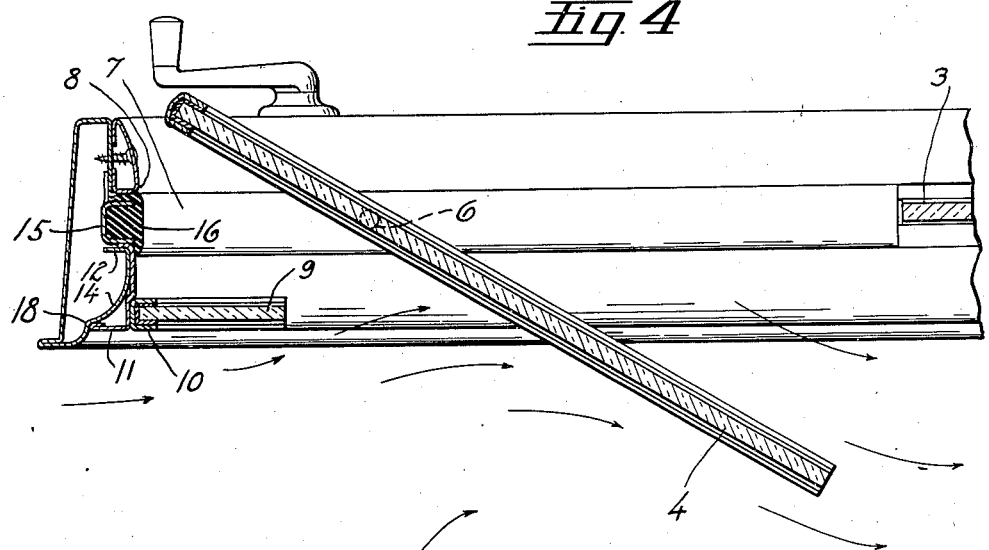
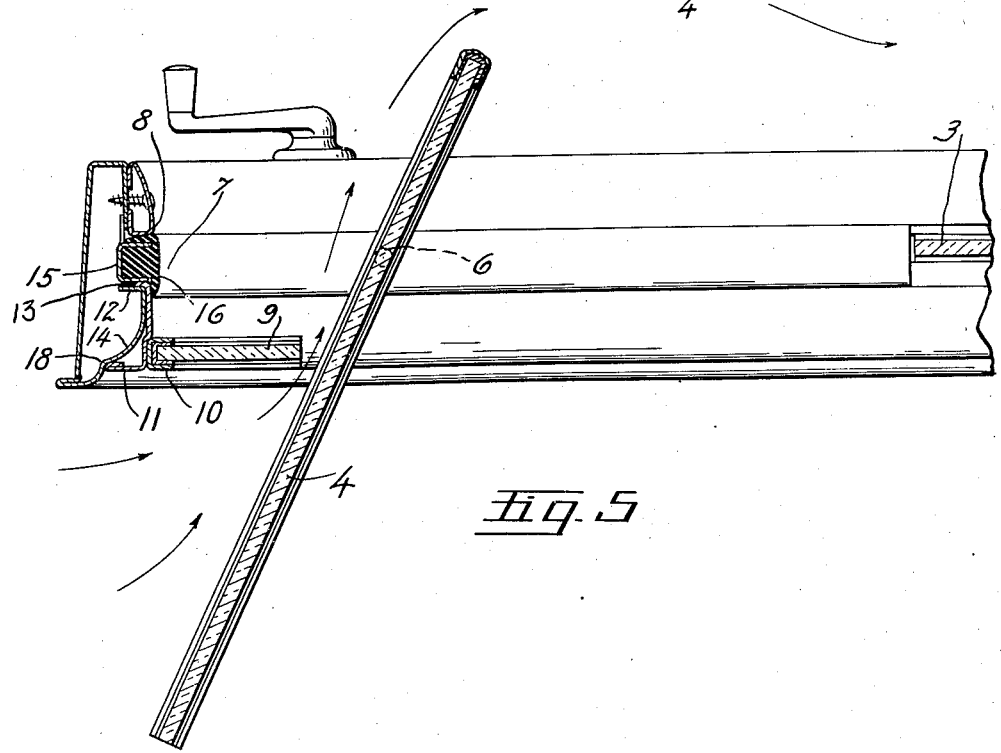
INVENTOR.
JOHN G. HICKMAN Patented Feb. 22, 1938

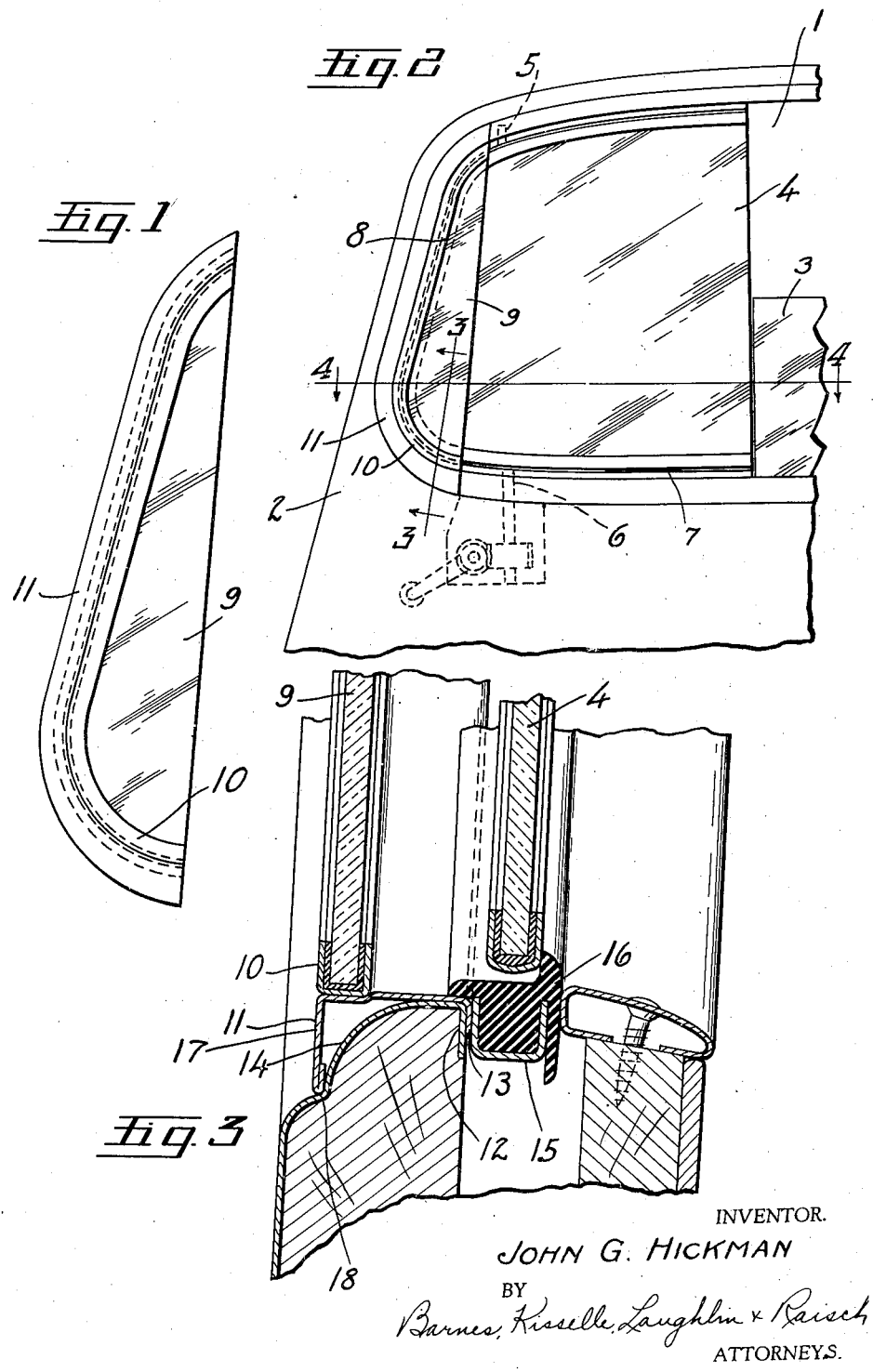

2,109,249

UNITED STATES PATENT OFFICE 2,109,249

VENTILATING WINDOW

John G. Hickman, Detroit, Mich., assignor to Ternstedt Manufacturing Company, Detroit, Mich., a corporation of Michigan Application August 12, 1935, Serial No. 35,689

3 Claims. (Cl. 296—44)

This invention relates to a ventilating window assembly for an automotive vehicle.

At present there are two principal forms of automotive vehicle ventilating windows in use. The one form is exemplified by the General Motors no draft ventilating window in which the window opening is closed by a pair of glass panels. In this form the forward panel is pivoted to swing on a vertical axis between its front and rear edges and the rear panel is slidable up and down from and into the window well. The other form is exemplified by the window presently used on Ford cars. This form comprises a single sliding glass panel for closing the window opening which, upon being raised from the window well, provides a ventilating opening extending only along the front vertical or inclined edge of the window glass panel. The panel can be slid forwardly to close this opening and thereby completely close the window opening. Both of these window assemblies are characterized by an opening along the front inclined or vertical edge of the window opening frame through which air is admitted into or exhausted from the body when the swinging panel of the former and the sliding panel of the latter are placed in ventilating position.

It is an object of this invention to produce an improved form of any type of automotive vehicle ventilating window assembly which, when the window panel is placed in ventilating position, is characterized by an opening extending between the window panel and an upright portion of the window frame between the top and bottom of the window opening and in particular where the opening extends between the forward edge of the panel and the front edge of the window opening as in the examples above specified.

It is the object of this invention to improve upon this form of ventilating window assembly so that a modified and better ventilating action is obtained and so that rain and bugs are prevented from entering the body through this opening. This object has been achieved by providing an auxiliary air deflector in the window opening opposite the ventilating opening when the ventilating window panel is placed in ventilating position, and more particularly by mounting an auxiliary glass panel along the front edge of the window frame outside of the ventilating window panel and which extends up and down alongside the ventilating opening.

In the drawings:

Fig. 1 is a side elevation of the auxiliary glass air deflector.

Fig. 2 shows the air deflector combined in a window opening with a no draft window assembly.

Fig. 3 is a section along the line 3—3 of Fig. 2.

Fig. 4 is a section along the line 4—4 of Fig. 2.

Fig. 5 is a section similar to Fig. 4 showing the swinging panel swung to scoop position.

In the drawings there is shown an automotive vehicle window opening 1 which in this case is the window opening in the front door 2 of an automobile. The window opening 1 is arranged to be closed by a no draft ventilating window assembly which comprises a rear sliding panel 3 and a front swinging panel 4. The sliding panel 3 is slidably mounted for movement into and out of the window well in the usual manner. The swinging panel 4 is pivoted as at 5 and 6 between its front and rear vertical edges so that it swings about a vertical axis. The panel 4 is arranged so that when swung to ventilating position the portion of the panel forward of the pivots swings inwardly of the body and the portion to the rear of the pivots swings outwardly of the body. When the panel 4 is swung to ventilating position, a ventilating opening 7 is provided between the front edge or frame portion 8 of the window opening 1 and the swinging panel 4. This opening 7 extends forwardly of the pivots 5 and 6 and vertically from the top to the bottom of the window opening 1.

For modifying the ventilating action of this or any other type of ventilating window where an opening is provided between the window panel when placed in ventilating position and the front vertical edge of the window opening, it is proposed to mount an auxiliary glass panel 9 in the window opening on the outside of the panel 4. The auxiliary glass panel 9 is mounted in a channel frame 10 which extends along the front edge of the panel. A channel member 11, coextensive with the glass channel 10, may be welded or otherwise fixed to the frame 10. To secure the glass panel 9 in the window opening the one side wall 13 of the channel 11 is positioned beneath the weatherstrip 16 and between the inside edge 12 of the window reveal 14 and the channel 15 for the weatherstrip 16. The edge of the other side wall 17 of the channel 11 rests against the shoulder 18 of the reveal 14.

As shown, the auxiliary glass panel 9 is positioned in the window opening but spaced from, and on the outside of, the ventilating panel 4. Although, as shown, the panel 9 preferably extends from the forward edge 8 of the window opening rearwardly only a portion of the distance to the pivots 5 and 6 so that the swinging panel 4 may be swung to scoop position as shown in Fig. 5, the panel 9 may extend to the rear of the pivots 5 and 6 although this would prevent the window 4 from being swung from closed position through 90° or more to scoop position. It is, of course, understood that the auxiliary glass 9 may be mounted in both the right and left front door window openings.

Several variables are present in defining the action of this type of modified ventilating window assembly, such as, direction of the wind and the wind velocity. Generally speaking, when the pivoted glass is opened slightly, say from 5 to 10 degrees, a vacuum is formed along the front edge of the window opening which causes the air to pass outwardly of the body through the portion of the window opening forward of the pivots 5 and 6. If the swinging panel is opened still further, for example, at 60° the air travels inwardly through the portion of the window opening forward of the pivots 5 and 6 and loops outwardly through the portion of the opening to the rear of the pivots 5 and 6. This air current loop, when the other front door window opening is closed, extends completely across the body. When the panel 4 is swung from closed position through 90° or more to scoop position, the air deflector 9 will prevent air from blowing directly into the passenger's or driver's face.

I claim:

1. In a vehicle body having a window opening, a panel mounted in the window opening and pivoted between its front and rear edges to swing about a vertical axis to provide an open space between the portion of the glass forward of the pivots and the forward edge of the window opening, the front edge of the said window panel engaging the forward edge of the window opening when the said panel is swung to closed position, and an auxiliary panel mounted along the forward edge of the window opening along the outside of, and spaced from, the swinging panel whereby when the swinging panel is swung to ventilating position the swinging panel and auxiliary panels cooperate to form a passageway for ventilating air currents.

2. In a vehicle body having a window opening, a panel mounted in the window opening and pivoted between its front and rear edges to swing about a vertical axis to provide an open space between the portion of the glass forward of the pivots and the forward edge of the window opening, the front edge of the said window panel engaging the forward edge of the window opening when the said panel is swung to closed position, and an auxiliary panel mounted along the forward edge of the window opening on the outside of, and spaced from, the swinging panel and having an air-tight seal with the forward edge of the window opening, the said auxiliary panel extending from the top to the bottom of the window opening and rearwardly from the forward edge of the window opening a portion of the length of the swinging panel.

3. In a vehicle body having a window opening, a panel mounted in the window opening and pivoted between its front and rear edges to swing about a vertical axis to provide an open space between the portion of the glass forward of the pivots and the forward edge of the window opening, the front edge of the said window panel engaging the forward edge of the window opening when the said panel is swung to closed position, the said auxiliary panel extending from the top to the bottom of the window opening opposite the said open space and rearwardly from the forward edge of the window opening between the axis of the swinging panel and the forward edge of the window opening whereby the said swinging panel may be swung from closed position through an arc of 90° or more to scoop position without abutting the rear edge of the auxiliary panel.

JOHN G. HICKMAN.